United States Patent

[11] 3,555,323

| [72] | Inventor | Hermann Gerber<br>Courgevaux, Switzerland |
|---|---|---|
| [21] | Appl. No. | 822,573 |
| [22] | Filed | May 7, 1969 |
| [45] | Patented | Jan. 12, 1971 |
| [73] | Assignee | Saia AG, Fabrik elektrischer Apparate<br>Bern, Switzerland |
| [32] | Priority | May 14, 1968 |
| [33] | | Switzerland |
| [31] | | No. 7153/68 |

[54] SMALL SYNCHRONOUS MOTOR
11 Claims, 7 Drawing Figs.

[52] U.S. Cl.................................................. 310/162,
310/156
[51] Int. Cl........................................................H02k 21/00
[50] Field of Search........................................... 310/162,
156, 181, 40MM, 163, 164, 263, 185, 186

[56] References Cited
UNITED STATES PATENTS

| 2,256,711 | 9/1941 | Hansen.......................... | 310/164 |
| 2,432,070 | 12/1947 | Sanborn......................... | 310/164 |
| 2,951,957 | 9/1960 | Elgeman........................ | 310/164 |
| 2,981,855 | 4/1961 | Van Lieshout................. | 310/162 |
| 3,427,485 | 2/1969 | Dotto.............................. | 310/164 |
| 3,428,841 | 2/1969 | Bossard.......................... | 310/164 |
| 3,448,306 | 6/1969 | Murray........................... | 310/162 |

Primary Examiner—D. F. Duggan
Assistant Examiner—R. Skudy
Attorney—Imirie & Smiley ABSTRACT: A small synchronous motor of the type having a rotor with permanent—magnet poles and a cagelike stator in the form of a closed ring enclosing an exciting coil and having at its inner side groups of axially extending main poles and of shaded auxiliary poles, the utilization of the available space and the efficiency of shading discs being improved and the number of poles and magnetic flux increased by providing one single group of main poles and one single group of auxiliary poles, each group occupying one-half of the stator circumference.

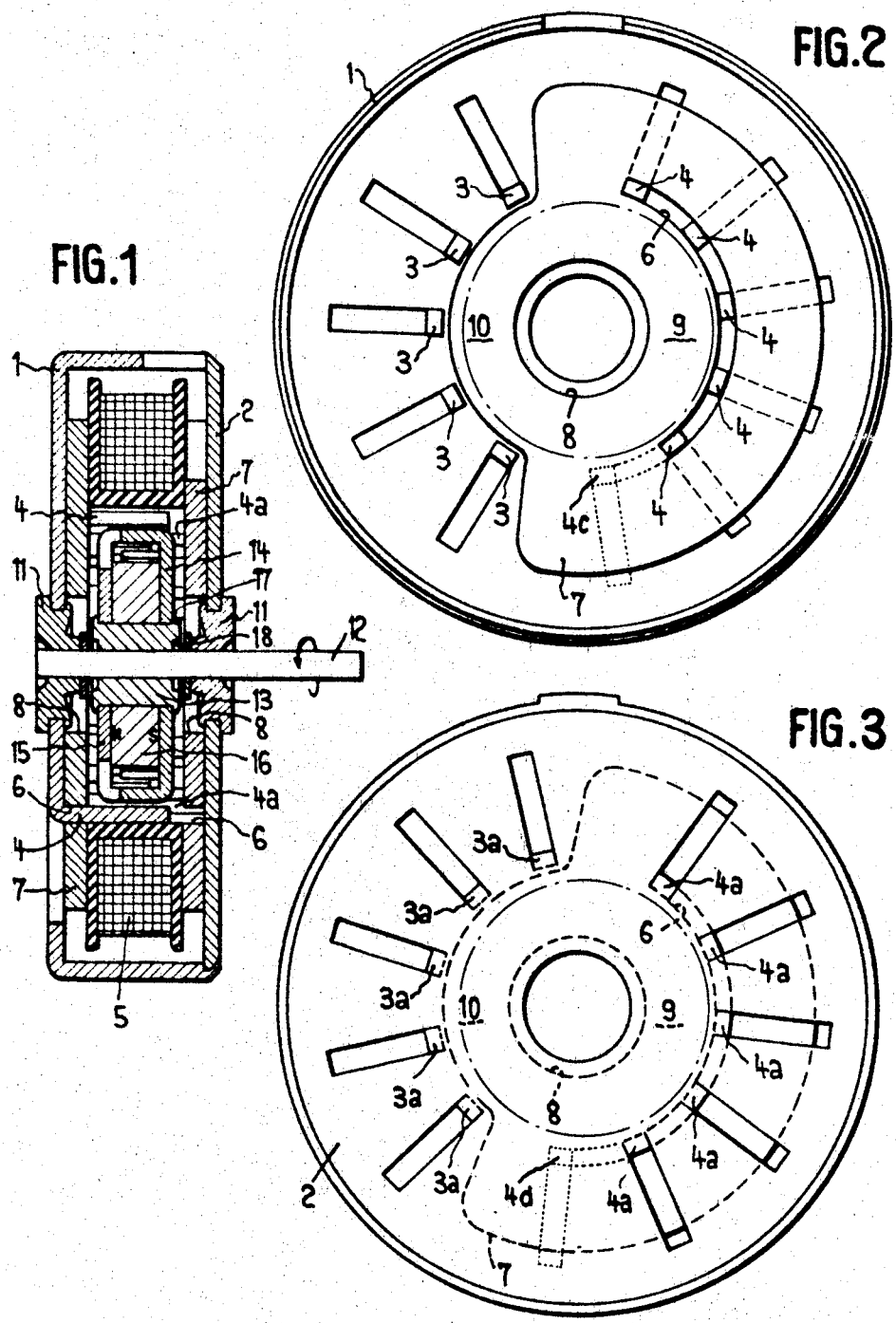

SMALL SYNCHRONOUS MOTOR

This invention relates to a small synchronous motor having a rotor with permanent-magnet poles and a cagelike stator in the form of a closed ring enclosing an exciting coil and having at its inner side groups of axially extending main poles and of auxiliary poles phase-shifted by means of short-circuiting discs. Synchronous motors of this type will start in a predetermined direction without any mechanical one-way escapement, due to the rotary field produced by the groups of main poles and auxiliary poles.

In particularly small synchronous motors it is difficult to produce a total flux in the auxiliary poles of the correct magnitude and phase relatively to the flux in the main poles. For producing a strong starting torque determining the starting direction of the motor, the rotary field should be such that the vectorial plotting through an angle of 360° corresponds to a circle as closely as possible. To this end the geometrical shifting of the auxiliary poles relatively to the main poles has to be in a predetermined relation to the phase of the flux in the auxiliary poles. The theory further shows that the phase shift of the flux in the auxiliary poles should be as important as possible, this depending on the design on the short-circuiting rings or discs whereby strong short circuit currents should be obtained by heavy cross sections of the short-circuiting conductors.

Due to the geometrical shifting of the groups of auxiliary poles relatively to the groups of main poles (in general about 135 electrical degrees), a relatively narrow gap remains between adjacent poles of one group of main poles and one group of auxiliary poles so that the cross section of the short-circuiting discs between these adjacent poles is relatively small.

Further, since prior synchronous motors of the above type have two pairs of diametrically opposite groups of main poles and auxiliary poles, narrow gaps are formed between adjacent groups in two places. In order to provide the necessary space for a short-circuiting disc between the groups of main poles and auxiliary poles it has been suggested to leave out the outermost main pole of each group which would be too near to the adjacent outermost pole of the group of auxiliary poles. This means that the total number of main poles is smaller than the total number of auxiliary poles. A further advantage was seen in this measure in that a main flux substantially equal to the auxiliary flux may be obtained in this way.

It is an object of this invention to substantially improve a small synchronous motor by providing one single group only of each main poles and auxiliary poles, each group extending through substantially one half of the stator circumference. The number of gaps between groups of main poles and auxiliary poles, wherein sufficient cross sections of the short-circuiting discs should be accommodated, is thus reduced to two, such that it is possible to increase the total number of poles. Consequently it is possible to increase the total main flux and auxiliary flux and the torque of the motor. Preferably the short-circuiting discs may have a single slit of substantially semicircular form receiving all auxiliary poles of one polarity, whereby the linkage between the short-circuiting discs and the auxiliary flux is improved.

A particular advantage of the disposition of the main poles and auxiliary poles in one single pair of diametrically opposite groups of poles resides in the possibility of optimal adjustment of the ratio between the total main flux and the total auxiliary flux by a slight excentricity of the rotor within a circular rim of poles in such a way that the mean air gap between the main poles and the rotor is wider than the mean air gap between the auxiliary poles and the rotor. In this way it is possible to select the ratio between main flux and auxiliary flux as desired independently of the ratio of total numbers of main and auxiliary poles. It is thus possible to use equal numbers of main and auxiliary poles.

This invention will now be explained in detail with reference to the accompanying drawing showing, by way of example, a few embodiments of the synchronous motor.

FIG. 1 is an axial section of the first embodiment,

FIGS. 2 and 3 show the stator portions of the first embodiment,

Figure 4:
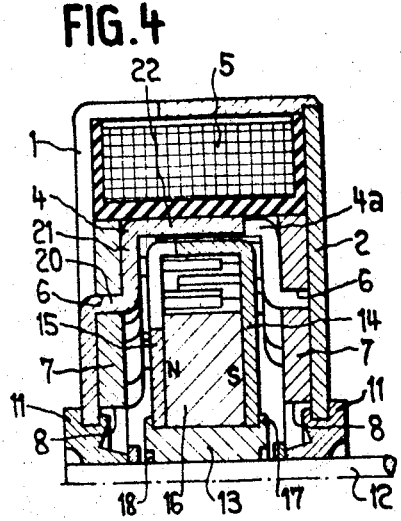
FIG. 4 is an axial section of the second embodiment.

The synchronous motor shown in FIGS. 1 to 3 has a shell-like casing portion 1 and a coverlike casing portion 2, both stamped from soft iron. Portions 1 and 2 are riveted together to form a casing. As shown in FIGS. 2 and 3 stator poles are cut out of the casing portions 1 and 2 and bent into axial position. The stator portion 1 has groups of five main poles 3 and five auxiliary poles 4. Casing portion 2 has corresponding groups of five main poles 3a and five auxiliary poles 4a. An annular exciting coil 5 is accommodated outside the stator poles. The auxiliary poles 4 and 4a respectively axially extend each through a substantially semicircular slit 6 of a short-circuiting disc 7 of copper. Inside their slit these short-circuiting discs have an opening for the rotor shaft, this opening being limited by two shunt webs 9 and 10 enclosing the rotor shaft. By these relatively short webs 9 and 10 the total electrical resistance of the short-circuiting conductor is substantially reduced.

Bearings 11 are riveted into apertures of the casing portions 1 and 2, a shaft 12 being pivoted in these bearings. A hub 13 is mounted on shaft 12, this hub carrying two toothed pole sheets 14 and 15 and an annular, axially magnetized permanent magnet 16 between sheets 14 and 15. The hub 13 made of a cylindrical tube adapted to be applied onto the shaft 12 with sliding fit and whereon the pole sheets 14 and 15 may also be applied with sliding fit, is subsequently upset by axial pressure so that upset portions 17 and 18 are produced by which the pole sheets 14 and 15 are fixed on the hub 13 and the hub 13 is fixed on shaft 12. As mentioned above it is a main object of the invention to provide as many stator poles as possible and to produce an auxiliary flux as intensive as possible by the subdivision of the poles in one single closed group of main poles and one single closed group of auxiliary poles. This disposition is readily seen from FIGS. 2 and 3. The main poles 3 and 3a of stator portions 1 and 2 will form a single closed group of main poles gripping into each other with alternatively opposite polarity when casing portions 1 and 2 are assembled, while the auxiliary poles will also form a single closed group of poles gripping into each other with alternatively opposite polarity. Each group extends through substantially one half of the circumference of the stator. Increased pole distance between the outermost poles of adjacent pole groups for accommodation of a sufficient cross section of copper of the short-circuiting discs 7 is only required in two places, and particularly in one place where the pole distance would normally be especially small. Therefore, the available space may be utilized as advantageously as possible. This advantage is further assisted by the high efficiency of the short-circuiting discs. Due to their continuous slits 6 the total auxiliary flux is interlinked with the total current flow in the short-circuiting discs. The concentration of the auxiliary poles in one single group in one half of the motor allows the use of relatively small and simple short-circuiting discs with high efficiency as compared with prior motors, wherein the short-circuiting discs have to enclose each two diametrically opposite groups of poles.

While in prior motors having two diametrically opposite groups of main poles and therebetween two groups of auxiliary poles, any excentric arrangement of the rotor would be without effect because it would be impossible to influence the ratio between main flux and auxiliary flux by any excentric arrangement. It is a particular advantage of this invention, that due to the diametrically opposite position of the group of main poles and group of auxiliary poles the ratio between main flux and auxiliary flux may be influenced and adjusted to an optimum value by a suitable excentricity of the rotor. Since the auxiliary flux is weaker under similar conditions than the main flux, the rotor will be shifted towards the group of auxiliary poles such that the mean air gap width between the auxiliary poles and the rotor is smaller than the mean air gap width between the main poles and the rotor. In this way the total auxiliary flux may be adjusted to any value relatively to the main flux. As an example, the auxiliary flux may be equal to the main flux even when the total number of auxiliary poles is equal to the number of main poles. This feature is indicated in FIGS. 2 and 3 by a dash-dotted line schematically showing the circumference of the rotor in a slightly excentric position nearer to the auxiliary poles 4 and 4a than to the main poles 3 and 3a. In spite of this excentricity, the stator poles may be disposed in a circular rim whereby manufacture is substantially facilitated. For a given motor type the excentricity is the same for all motors and may be predetermined by stamping the mounting holes for the bearings 11 in an excentric position or by using bearings having a bearing bore excentric with respect to the outer mounting surface of the bearing seated in concentric mounting holes of the stator portions. In the latter case, orienting means may be provided on the bearings and casing portions so that the bearings may only be inserted in a predetermined correct position.

As indicated in FIGS. 2 and 3 the motor may have equal numbers of main poles and auxiliary poles as shown in full lines or an additional auxiliary pole 4c and 4d respectively may be provided as shown in dotted lines. Even in this case sufficient space remains between these additional auxiliary poles and the adjacent outermost main poles 3 and 3a respectively for accommodation of a large cross section of copper.

Figure 5:
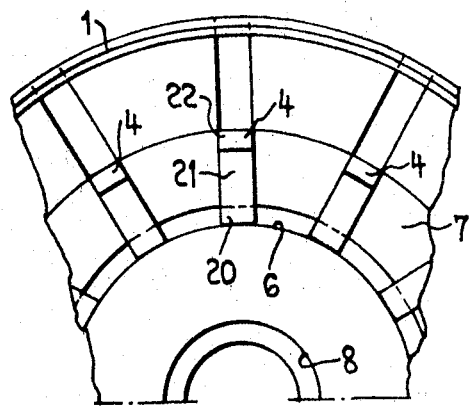
FIG. 5 shows one of the stator portions of the embodiment of FIG. 4.

FIGS. 4 and 5 illustrate another embodiment of the motor, wherein corresponding parts are designated as in FIGS. 1 to 3. The main difference of this embodiment over the one shown in FIGS. 1 to 3 resides in the fact that the axial portions 20 of the auxiliary poles 4 and 4a respectively extending through the slit of the short-circuiting discs 7 are radially displaced inwardly, such that the short-circuiting discs 7 may be accommodated entirely inside the coil 5 in radial and axial direction. The auxiliary poles are of Z-shape and have an axial portion 20, a portion 21 extending radially outwards at the inner side of the short-circuiting discs 7 and an outer axial end portion 22.

This design has the advantage that the short-circuiting discs 7 may be accommodated radially and axially inside the coil 5. Therefore, more space is available for the coil than in the embodiment of FIGS. 1—3. Another advantage resides in the fact that an additional flux linkage is obtained between the radial portions 21 of the auxiliary poles and the rotor. In other language, this design allows a particularly desirable increase in effective surface of the auxiliary poles as compared with the effective surface of the auxiliary poles of FIGS. 1 to 3. It may be possible with the design of FIGS. 4 and 5 to obtain practically equal main flux and auxiliary flux with equal numbers of main and auxiliary poles. In order to keep the magnetic resistance in the Z-shaped auxiliary poles as low as possible, portion 20 of such auxiliary poles accommodated in the slit 6 of the short-circuiting disc 7 may be larger in circumferential direction than portions 21 and 22.

Figure 6:
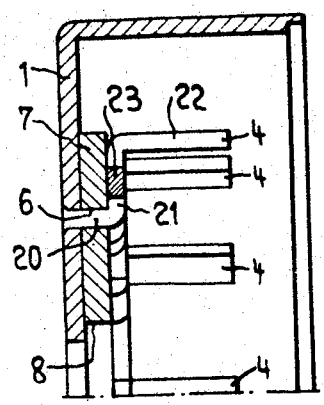
FIG. 6 is a partial axial section of a third embodiment.
Figure 7:
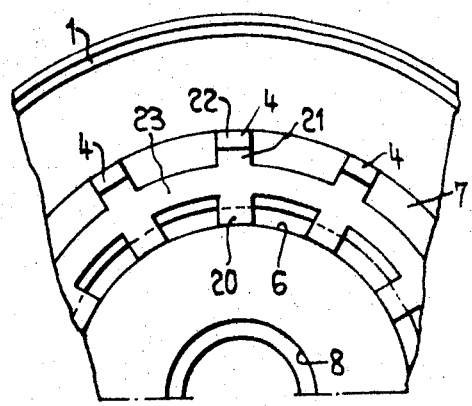
FIG. 7 is a partial view of the stator of the embodiment according to FIG. 6.

In some cases it may be difficult to cut all the material required for the Z-shaped auxiliary poles shown in FIGS. 4 and 5 from the material of the stator portions and to bend the poles. This difficulty may be overcome if, according to FIGS. 6 and 7, two rims of auxiliary poles 20, 21, 22 are stamped and shaped as separate pieces, whereby the poles of each rim are interconnected by a web 23, and each rim is riveted to one of the stator portions 1 or 2. The web 23 should be placed as near as possible to the radially inner end of the rim, and it may be accommodated in the slit 6 of the adjacent short-circuiting disc 7.

In the embodiment shown in FIGS. 1 to 3, where portions of the short-circuiting discs are located between the coil and a stator portions, the short-circuiting discs may be uneven, for instance corrugated or in the form of cup springs such that they are slightly elastically deformed when mounted in the motor. Thereby these discs and the coil are secured in axial direction by the elastic clamping force of the short-circuiting discs.

I claim:
1. A small synchronous motor having a rotor with permanent—magnet poles and a cage—like stator in the form of a closed ring enclosing an exciting coil and having at its inner side groups of axially extending main poles and of auxiliary poles phase — shifted by means of short — circuiting discs, characterized by one single group only of each main poles and auxiliary poles, each group extending through substantially one half of the stator circumference, and said auxiliary poles being shaded by short-circuiting discs engaging between auxiliary poles and main poles in two places each.

2. A motor according to claim 1, wherein the main poles and auxiliary poles are disposed in a common cylindrical surface and the rotor is excentrically shifted towards the group of auxiliary poles, the ratio of total main flux to total auxiliary flux being thereby optimally adjusted by selection of the excentricity and the ratio of the mean width of the air gap between the group of main poles and the rotor and between the group of auxiliary poles and the rotor respectively.

3. A motor according to claim 2, wherein the stator has mounting holes coaxially disposed with respect to the rim of poles, and the bearings mounted in said holes having bores receiving the rotor shaft, said bores being excentrically disposed within an outer mounting surface of the bearing seated in said holes.

4. A motor according to claim 1, wherein all auxiliary poles of each polarity extend through a substantially semicircular slit of said short-circuiting disc associated to them.

5. A motor according to claim 4, wherein the short-circuiting discs have an aperture receiving the rotor shaft, said aperture being limited by two webs enclosing the rotor shaft.

6. A motor according to claim 1, wherein the auxiliary poles have a first portion extending radially outwardly between said short-circuiting disc and the rotor and a second portion extending axially between the rotor and the exciting coil.

7. A motor according to claim 6, wherein the short-circuiting discs are disposed radially and axially inside the exciting coil.

8. A motor according to claim 6, wherein the auxiliary poles are stamped from the stator sheets and are bent in Z-shape.

9. A motor according to claim 6, having two rims of auxiliary poles in the form of stamped parts wherein the poles of each rim are interconnected by a connecting web riveted to the stator sides.

10. A motor according to claim 1, wherein two pole sheets of the rotor enclosing an annular permanent magnet are mounted on a hub, the hub ends having axially upset portions by which the pole sheets are fixed on the hub and the hub is fixed on the rotor shaft.

11. A motor according to claim 1, wherein the short-circuiting discs are slightly uneven, for instance corrugated, thereby anchoring the exciting coil and the short-circuiting discs by elastic clamping forces between the stator sheets.